United States Patent
Hofmann et al.

(10) Patent No.: US 6,762,364 B2
(45) Date of Patent: Jul. 13, 2004

(54) CABLE ENCLOSURE

(75) Inventors: Jens Hofmann, Ottobrunn (DE); Herbert Schumacher, Munich (DE)

(73) Assignee: Tyco Electronics Raychem GmbH (DE)

(*) Notice: Subject to any disclaimer, the term of this patent is extended or adjusted under 35 U.S.C. 154(b) by 0 days.

(21) Appl. No.: 10/257,822

(22) PCT Filed: Apr. 20, 2001

(86) PCT No.: PCT/GB01/01780

§ 371 (c)(1), (2), (4) Date: Oct. 17, 2002

(87) PCT Pub. No.: WO01/86773

PCT Pub. Date: Nov. 15, 2001

(65) Prior Publication Data

US 2003/0141094 A1 Jul. 31, 2003

(30) Foreign Application Priority Data

May 5, 2000 (GB) .............................. 0010970

(51) Int. Cl.[7] .............................................. H01R 4/00
(52) U.S. Cl. .......................... 174/84 R; 174/92; 29/631; 428/34.9
(58) Field of Search .............................. 428/36.9, 36.91, 428/36.92, 34.9, 35.1, 35.7, 36.8; 138/103, 178; 174/74 R, 77 R, 84 R, 91, 92, 74 A, 93, 73.1, 138 F, DIG. 8, 77, 85; 29/631, 605, 870, 869

(56) References Cited

U.S. PATENT DOCUMENTS

| | | | | |
|---|---|---|---|---|
| 2,523,716 A | * | 9/1950 | Parr ........................... 277/605 |
| 4,442,153 A | * | 4/1984 | Meltsch ....................... 428/99 |
| 4,506,430 A | * | 3/1985 | Guzay, Jr. ..................... 29/450 |
| 4,517,234 A | * | 5/1985 | Fisher ......................... 428/119 |
| 4,684,764 A |   | 8/1987 | Luzzi .......................... 174/91 |
| 4,746,147 A |   | 5/1988 | Walker ......................... 285/53 |
| 5,070,597 A | * | 12/1991 | Holt et al. .................... 29/887 |
| 5,098,752 A | * | 3/1992 | Chang et al. .................. 428/34.9 |
| 5,169,176 A | * | 12/1992 | Brossard ...................... 285/21.1 |
| 5,171,940 A | * | 12/1992 | Vallauri ....................... 174/73.1 |
| 5,753,861 A | * | 5/1998 | Hansen et al. ................. 174/93 |
| 5,826,886 A |   | 10/1998 | Hauff et al. ................... 277/314 |
| 6,245,999 B1 | * | 6/2001 | Costigan et al. ............... 174/74 A |

FOREIGN PATENT DOCUMENTS

| | | |
|---|---|---|
| EP | 0 209 399 | 1/1987 |
| EP | 0 210 807 | 2/1987 |
| EP | 0 212 851 | 3/1987 |
| EP | 0 712 192 | 5/1996 |
| WO | 91/13756 | 9/1991 |
| WO | 92/02754 | 2/1992 |

OTHER PUBLICATIONS

International Search Report for PCT/GB01/01780, Jul. 24, 2001.
International Preliminary Examination Report for PCT/GB01/01780, Jul. 16, 2002.
Great Britain Search Report for GB00010970.2, Oct. 18, 2000.

* cited by examiner

Primary Examiner—William H. Mayo, III
(74) Attorney, Agent, or Firm—Myers Bigel Sibley & Sajovec

(57) ABSTRACT

An enclosure for mounting on a substrate includes a rigid tubular support member and a revolvable elastic sleeve having a double wall enclosing lubricant sealed therein. The sleeve is mounted on the support member in an expanded state with a portion of the inner wall of the sleeve secured to the support member so that the sleeve can be revolved over the end of the support member to contract elastically to a less expanded state while retaining a portion of the sleeve on the support.

21 Claims, 2 Drawing Sheets

CABLE ENCLOSURE

RELATED APPLICATIONS

The present application is a National Phase application of PCT/GB01/01780 filed on Apr. 20, 2001 and published in English, which claims priority from application GB 00109790.2 filed on May 5, 2000.

FIELD OF THE INVENTION

This invention relates to an enclosure, and particularly though not exclusively to one for use with a cable, for example a cable joint or termination.

The enclosure of the invention finds particular application to electric, and especially power, cables, but is also applicable to other cables, for example telecommunications cables.

BACKGROUND OF THE INVENTION

For convenience only and not by way of limitation, the invention will be discussed with reference to an electric power cable joint. When two power cables are to be jointed, the outer layers thereof are successively stripped back to expose the conductors. The electrical connection between the conductors is then effected in any convenient manner. The outer layers of the cables then need to be replaced by fresh components in order to restore electrical and mechanical integrity, and this may be effected in various ways, using various technologies, including tape wrapping. Heat shrink technology, for example using heat recoverable polymeric sleeves and kits from Tyco Electronics Raychem GmbH, has been known and used successfully for many years, often in preference to the traditional filling of a casing with hot bitumen or epoxy resin.

As an alternative to heat-shrinkable sleeves, elastic sleeves that are recoverable around a cable joint without the application of heat thereto have been available for some time. One example of such a sleeve is that sold by 3M under the tradename PST, which consists of an elastomeric cylindrical sleeve that is held out in an expanded configuration by a rigid inner spiral member. These sleeves, mounted on their hold-outs, are positioned over the cable joint, and the hold-out is then removed from inside the sleeve. Other elastic sleeves are known which are held out in an expanded configuration on a rigid support member with an end of the sleeve folded back on top of the portion of the sleeve which is in direct contact with the tubular support, as described by 3M in EP-A-0767523. When the tubular hold-out is positioned over the cable joint, the folded-back portion of the sleeve may be rolled over the end of the hold-out to form a bridge that contracts elastically down onto the cable. It is observed in EP-A-0767523 that the removal of the spiral holdouts is problematic and that physical stress relief adaptations are necessary for the folded-back sleeves.

WO-A-9113756 describes a revolvable double-wall elastomeric sleeve, available from Tyco Electronics Raychem GmbH under the tradename RAYVOLVE, that has a lubricant enclosed by the double wall of the sleeve. This sleeve, which is not previously expanded, can be rolled onto a cable to one side of the jointing area, which usually involves having to increase the sleeve diameter by up to a factor of two or more, and subsequently can be revolved back across the formed joint. The lubricant facilitates the revolving of the two, inner and outer, walls of the sleeve over one another. The lubricant remains within the sealed double wall of the sleeve, allowing the sleeve to be revolved away and re-used, if the joint needs to be reentered. A RAYVOLVE sleeve is usually employed to provide at least some of the insulation over the cable joint, and may, for example, functionally replace the outer jacket of the cable at the cable joint.

SUMMARY OF THE INVENTION

It is an object of the present invention to provide an improved enclosure for a substrate. In accordance with one aspect of the present invention, there is provided an enclosure for mounting on a substrate, comprising a rigid tubular support member and a revolvable elastic sleeve having a double wall enclosing lubricant sealed therein, wherein the sleeve is mounted on the support member in an expanded state with a portion of the inner wall of the sleeve secured to the support member so that the sleeve can be revolved over the end of the support member to contract elastically to a less expanded state while retaining a portion of the sleeve on the support.

Thus, the revolvable sleeve is retained attached to the support member but is able to be revolved off the member so as to be recovered to a smaller size around the underlying substrate, in conformity therewith. The retention of the sleeve at one end on the support member allows the positioning of the other end of the sleeve on the substrate after deployment to be controlled, thus ensuring, for a given enclosure and substrate, not only that sufficient overlap onto the substrate is achieved, but also that the sleeve does not roll too far off the support member. The revolvable nature of the sleeve inherently facilitates re-entry of the substrate, for example a cable joint, if required. The provision of the support member provides for storage of the sleeve prior to initial installation and also during any re-entry of the substrate. It has been found that the support member may be economically manufactured, for example by simply cutting and de-burring suitable lengths from an extruded plastics tube, advantageously omitting any special stress relief adaptations. This advantage may possibly result from the self-reinforcing effect of the double-wall sleeve, which resists damage at the end regions of the support member more effectively that single-wall folded-back sleeves.

The sleeve may be secured to the support member by any suitable means. It is envisaged that this may be by bonding, for example using an interposed adhesive, and/or by mechanical compression around the outside of the sleeve, for example using a hose clamp or roll spring, and/or by being compressed onto the inner surface of the support member by an inner expandable means. The sleeve may thus conveniently be sealed to the support member. Typically, the support member is of substantially elongate cylindrical shape, with the sleeve being secured to or adjacent one end thereof.

A further sleeve, similar to the aforementioned sleeve, may be mounted on and secured to the support member, typically providing an arrangement whereby the sleeves can be revolved down off respective ends of the support member onto the substrate, for example a cable each side of a joint, whilst remaining secured on to the support member by the said portions. The or each sleeve is preferably a RAYVOLVE sleeve. Such sleeves are disclosed in European Patent Application Publication Nos. 0 209 399, 0 210 061, 0 210807 and 0 212 851, the entire disclosures of which are incorporated herein by this reference, A sealant such as a mastic, may be provided, advantageously on the substrate or on the sleeve, to seal the sleeve or sleeves to the substrate.

The rigid support member can thus provide mechanical protection for the substrate. Advantageously, it is made from a plastics material. The support member may also provide an electrical function, especially when the enclosure surrounds an electric cable. For example, it may provide an electrically insulating layer. The support member may be made of metal, or otherwise be metallic, for example being metallised, and thus may provide electrical continuity or earthing over the substrate, or electrical screening thereof.

Storing the double-walled lubricated elastic sleeve in an expanded configuration, on the rigid support member, avoids the need to urge it into an expanded condition as it is revolved up onto a substrate, such as a cable joint. Unlike known single layer expanded elastic sleeves, the lubricant stays in place, it does not dry out, and it is not exuded from the interface between the sleeve and the support member, so that removal of the sleeve from the tubular hold-out member is facilitated. The sleeve may be expanded to between, say, two and four times its original diameter, thus providing an enclosure, having a suitably sized rigid support member, with a good range-taking capability. The sleeve can thus be revolved off the support member onto the substrate with the application of little force, even though its rubber wall has been stored in a stretched configuration for some time, with the enclosed lubricant having been subjected to high pressure. The enclosure has a comparatively small overall length, since the sleeve (or sleeves) can be stored thereon within its overall length.

BRIEF DESCRIPTION OF THE DRAWINGS

Embodiments of an enclosure, each in accordance with the present invention, will now be described, by way of example, with reference to the accompanying drawings, in which.

DETAILED DESCRIPTION OF THE ILLUSTRATED EMBODIMENTS

Figure 1:
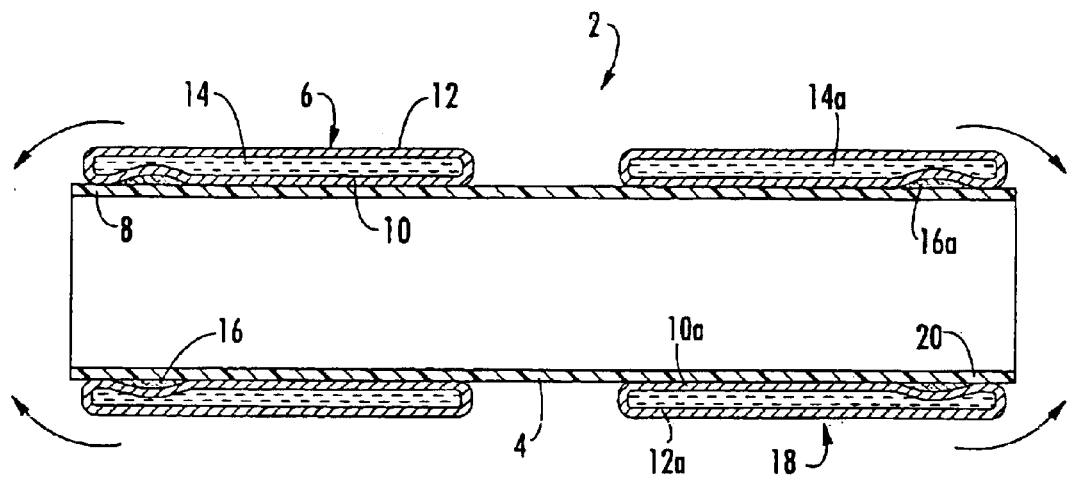
FIG. 1 is a section through a first embodiment of enclosure prior to its installation over a power cable joint.
Figure 2:
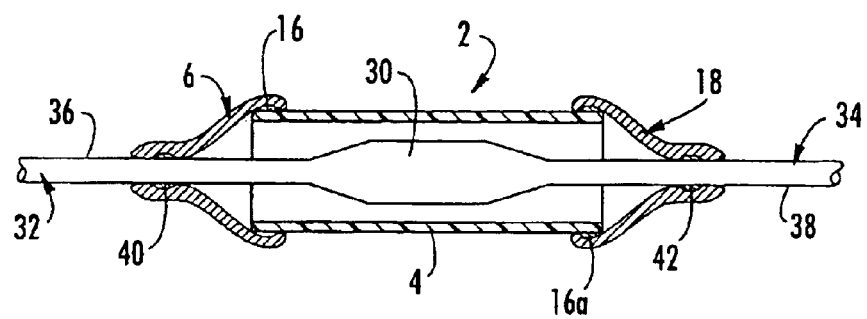
FIG. 2 is a simplified partial section through the installed enclosure of FIG. 1.

Referring to FIGS. 1 and 2, an enclosure 2 comprises a tubular right-cylindrical rigid elongate plastics tube 4. A revolvable RAYVOLVE sleeve 6, which has been expanded to three times its original diameter is mounted on one end 8 of the tube 4. The sleeve 6 has an inner wall 10 that lays along the outer surface of the tube 4 and, contiguous therewith, an outer wall 12. A liquid lubricant 14 is trapped between the walls 10 and 12 of the sleeve 4 so as to allow free revolving movement of the sleeve. A strip of adhesive 16 extends around the outer circumference of the tube 4 adjacent its end 8 and serves to secure the inner wall 10 of the sleeve 6 to the tube 4. A further RAYVOLVE sleeve 18, substantially identical with the sleeve 6, is similarly secured at the other end 20 of the tube 4. Components of the sleeve 6 corresponding to those of the sleeve 4 are identified with the addition of the reference "a".

FIG. 1 shows the enclosure 2 in its configuration after manufacture, with the two RAYVOLVE sleeves 6 and 18 expanded and secured thereto, prior to the mounting of the enclosure 2 on to a substrate. FIG. 2 shows the enclosure 2 of FIG. 1 subsequent to its mounting on a substrate, which in this embodiment is exemplified as an electrical power cable joint. Thus, the enclosure 2 is shown in FIG. 2 after it has been mounted so as to encompass a joint region 30 between two electrical power cables 32 and 34. It will be appreciated that the particular enclosure 2 will have been selected such that the tube 4 has a diameter that allows it easily to include the joint region 30. Also, the enclosure 2 will have been selected such that the length of the tube 4 extends sufficiently beyond the joint region 30.

Prior to forming the joint between the cables 32 and 34, the enclosure 2 is parked to one side over one of the cables. The joint between the conductors of the two cables is made in a convenient manner, for example by means of a crimp, primary insulation is provided around the jointed conductors, and additional insulation and screening as required in dependence upon the power rating and structure of the cables 32 and 34 is applied. The enclosure 2 is then removed from its parked position and centralised over the joint region 30. The RAYVOLVE sleeves 6 and 18 are revolved off their respective ends 8 and 20 of the tube 4 and allowed to contract down to the outer jackets 36 and 38 respectively of the cables 32 and 34. It will be appreciated that the sleeves 6 and 18 will be retained on the tube 4 by means of the respective adhesive strips 16 and 16a. Furthermore, a sealant 40, 42, is provided so as to lie between the respective sleeves 6 and 18 and the underlying outer jacket 36, 38 of the cables 32 and 34, so as to seal the sleeve 6, 18 on to the respective cable 32, 34. Thus, the enclosure 2 in its recovered position, as shown in FIG. 2, provides mechanical protection by means of its rigid tube 4 around the joint region 30 of the cables, and provides sealing on to the cable jackets 36 and 38 at each side thereof. It will be appreciated that should there be a need to re-enter the joint region 30, this may be easily accomplished by rolling the sleeves 6 and 18 back up onto the tube 4 and moving the released enclosure 2 to one side, thereby leaving the enclosure 2 available for re-use.

The enclosure of the first embodiment has been described with the revolvable sleeves 6 and 18 secured to the plastics tube 4 by being bonded thereto, using an adhesive 16, 16a respectively. It is envisaged, however, that the or each revolvable sleeve may be secured to the support member alternatively, or additionally, by a mechanical clamping means, which need not require the formation of a bond. Arrangements of such enclosures are shown in FIGS. 3 to 6, which show a detail only of the securement of the revolvable sleeve to the support member, other features of these enclosures may correspond to those disclosed above.

Figure 3:
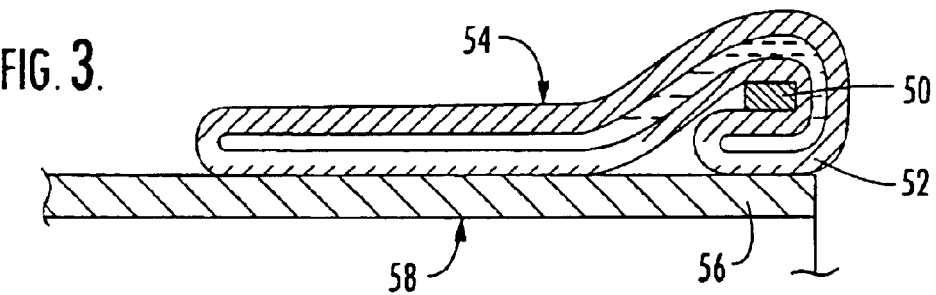
FIG. 3 is a section through a detail of a second enclosure prior to deployment.
Figure 4:
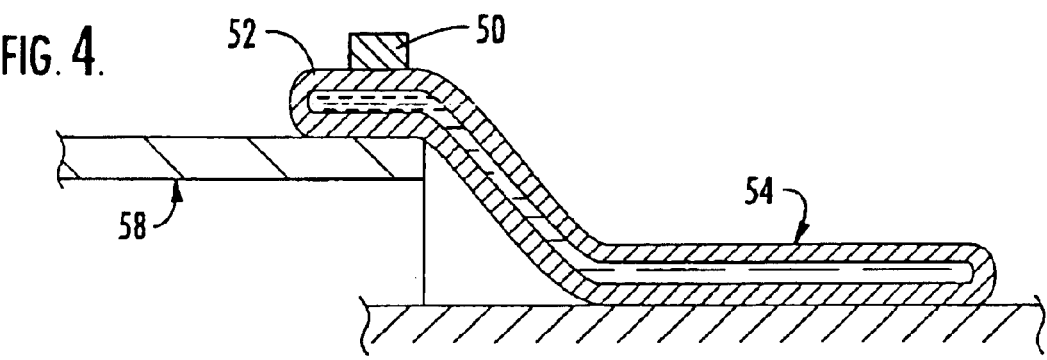
FIG. 4 is a section through the second enclosure in its deployed configuration.

Referring to FIGS. 3 and 4, a generally circular hose clamp 50 is located around one end 52 of a revolvable sleeve 54, adjacent one end 56 of a rigid cylindrical plastics tube 58. As with the enclosure of the first embodiment, the enclosure formed thereby is mounted over a substrate and the sleeve 54 is revolved over the end 56 of the tube 58 into the deployed position as shown in FIG. 4, with the sleeve end 52 clamped around its outer surface to the tube 58 by the hose 50. It will thus be appreciated that the inwardly-directed compression of the hose clamp 50 retains the sleeve 54 on the tube 58 at all times.

Figure 5:
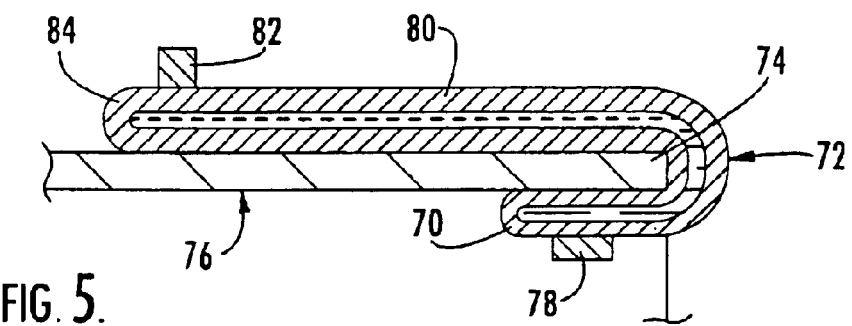
FIG. 5 is section through a detail of a third enclosure prior to deployment.
Figure 6:
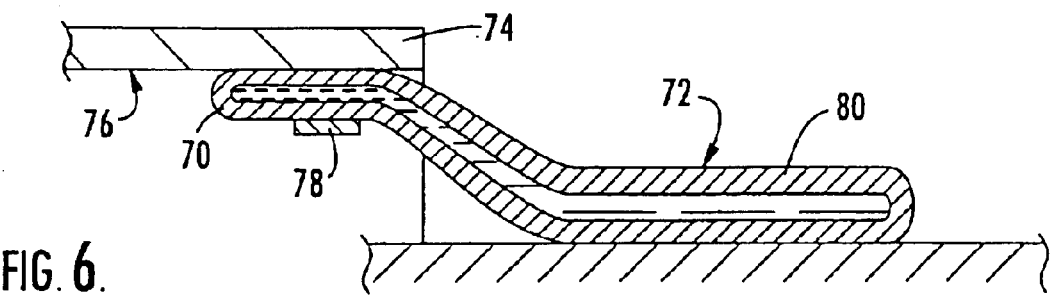
FIG. 6 is section through the third enclosure in its deployed configuration.

In a further embodiment of a clamping means shown in FIGS. 5 and 6, one end 70 of a revolvable sleeve 72 is folded inwardly over one end 74 of a cylindrical rigid plastics tube 76 and is held in place by a spiral spring 78 located around the inner circumference thereof. It will be appreciated that the spring 78 has a tendency to uncoil outwards and thereby compresses the end 70 of the sleeve 72 against the inner circumference of the end 74 of the tube 76. The remaining length 80 of the sleeve 72 lies along the outer surface of the tube 76. To prevent any tendency of the sleeve portion 80 to revolve off the tube 76 of its own accord, an outer circumferential fixing device 82 is located therearound at the opposing end 84 of the sleeve 72. The fixing device 82 may conveniently be breakable by hand, whereby the sleeve portion 80 may be revolved over the outer surface of the tube 76 and deployed down onto the substrate, as can be seen from FIG. 6. Advantageously, breaking of the fixing device 82 may trigger self-deployment of the sleeve 72 down onto the substrate.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. An enclosure for mounting on a substrate, comprising a rigid tubular support member;
   a revolvable elastic sleeve having a double wall enclosing lubricant sealed therein extending in an expended state along a portion of an outer surface of the support member at an end of the support member, wherein an inner wall of the sleeve is positioned between an outer wall of the sleeve and the outer surface of the support member along the portion of the outer surface to allow the sleeve to be revolved over the end of the support member to a less expanded state by linear movement of the outer wall of the sleeve along the inner wall of the sleeve; and
   a securing means that secures the sleeve to the support member so that the sleeve can be revolved over the end of the support member to contract elastically to a less expanded state while retaining a portion of the sleeve on the support.

2. The enclosure of claim 1 further comprising a further double-walled elastic sleeve having lubricant sealed therein, the further sleeve being mounted on the support member in an expanded configuration at an opposite end of the support member.

3. The enclosure of claim 1 wherein the securing means comprises an adhesive.

4. The enclosure of claim 1 wherein the securing means comprises a clamp.

5. The enclosure of claim 4 wherein an end portion of the sleeve extends around the end of the support member and along an inner surface of the support member and wherein the clamp is positioned to secure the end portion of the sleeve to the inner surface of the support member.

6. The enclosure of claim 5 further comprising a fixing device securing an opposite end portion of the sleeve to the outer surface of the support member.

7. The enclosure of claim 6 wherein the sleeve is configured to revolve itself over the end of the support member when the fixing device is removed.

8. An enclosure for mounting on a substrate, comprising a rigid tubular support member and a revolvable elastic sleeve having a double wall enclosing lubricant sealed therein, wherein the sleeve is mounted on the support member in an expanded state with a portion of the inner wall of the sleeve secured to the support member so that the sleeve can be revolved over the end of the support member to contract elastically to a less expanded state while the secured portion of the inner wall of the sleeve retains a portion of the sleeve on the support member.

9. An enclosure according to claim 8, wherein the support member is of substantially elongate cylindrical shape, and the sleeve is secured thereto in the region of one end thereof.

10. An enclosure according to claim 9, comprising a further double-walled elastic sleeve having lubricant sealed therein, the further sleeve being mounted on the support member in an expanded configuration with a portion of its inner wall secured to the support member in the region of the other end thereof.

11. An enclosure according to claim 8, wherein the sleeve is secured to the support member by adhesive.

12. An enclosure according to claim 8, wherein the sleeve is secured to the support member by a clamping means.

13. An enclosure according to claim 8, wherein the support member is made of a plastics material.

14. An enclosure according to claim 8, wherein the sleeve has been revolved along the support member and contracted onto the substrate.

15. An enclosure according to claim 14, further portion of the inner wall of the sleeve is scaled on to the substrate.

16. An enclosure according to claim 14, wherein the substrate comprises an electric cable.

17. An enclosure according to claim 16, wherein the support member provides electrical screening of the cable.

18. A method for forming a cable enclosure comprising:
   positioning a rigid tubular support member over a cable, the support member having a revolvable elastic sleeve having a double wall enclosing lubricant sealed therein, mounted on the support member in an expanded state; and
   revolving the sleeve over an end of the support member to contract elastically to a less expanded state and contact the cable adjacent the end of the support member to form the cable enclosure, wherein a portion of the inner wall of the sleeve is secured to the support member so that the sleeve can be revolved over the end of the support member while retaining a portion of the sleeve on the support member.

19. The method of claim 18 wherein the support member has a further revolvable elastic sleeve having a double wall enclosing lubricant sealed therein mounted on the support member in an expanded state at an opposite end of the support member and wherein the method further comprises:
   revolving the further revolvable elastic sleeve over the opposite end of the support member to contract elastically to a less expanded state and contact the cable adjacent the opposite end of the support member, wherein a portion of the inner wall of the further revolvable elastic sleeve is secured to the support member so that the further revolvable elastic sleeve can be revolved over the opposite end of the support member while retaining a portion of the further revolvable elastic sleeve on the support member.

20. The method of claim 18 wherein revolving the sleeve over an end of the support member to contract elastically to a less expanded state comprises moving the outer wall of the sleeve linearly along the inner wall of the sleeve.

21. The method of claim 18 wherein the sleeve is secured to an inner surface of the support member at a first end of the sleeve and a fixing device secures an opposite end portion of the sleeve to the outer surface of the support member and wherein revolving the sleeve over an end of the support member to contract elastically to a less expanded state comprises removing the fixing device to allow the sleeve to revolve itself over the end of the support member.

* * * * *

UNITED STATES PATENT AND TRADEMARK OFFICE
CERTIFICATE OF CORRECTION

PATENT NO.         : 6,762,364 B2  
APPLICATION NO. : 10/257822  
DATED                  : July 13, 2004  
INVENTOR(S)        : Hofmann et al.

It is certified that error appears in the above-identified patent and that said Letters Patent is hereby corrected as shown below:

On the Cover Sheet:

Section 74 should read --*Attorney, Agent, or Firm*—Myers Bigel Sibley & Sajovec --

In the Claims:

Column 6, lines 19-20 should read -- 15. An enclosure according to claim 14, wherein a further portion of the inner wall of the sleeve is sealed on to the substrate. --

Signed and Sealed this

Thirteenth Day of March, 2007

JON W. DUDAS  
*Director of the United States Patent and Trademark Office*

UNITED STATES PATENT AND TRADEMARK OFFICE
CERTIFICATE OF CORRECTION

PATENT NO. : 6,762,364 B2
APPLICATION NO. : 10/257822
DATED : July 13, 2004
INVENTOR(S) : Hofmann et al.

It is certified that error appears in the above-identified patent and that said Letters Patent is hereby corrected as shown below:

On the Cover Sheet:

Section 74 should read --*Attorney, Agent, or Firm*—Myers Bigel Sibley & Sajovec --

In the Claims:

Column 6, lines 19-20 should read -- 15. An enclosure according to claim 14, wherein a further portion of the inner wall of the sleeve is sealed on to the substrate. --

Signed and Sealed this

Twenty-seventh Day of March, 2007

JON W. DUDAS
*Director of the United States Patent and Trademark Office*